United States Patent [19]

Horsma et al.

[11] 4,421,582
[45] * Dec. 20, 1983

[54] SELF-HEATING ARTICLE WITH DEFORMABLE ELECTRODES

[75] Inventors: David A. Horsma, Palo Alto; Stephen H. Diaz, Los Altos, both of Calif.

[73] Assignee: Raychem Corporation, Menlo Park, Calif.

[*] Notice: The portion of the term of this patent subsequent to Apr. 18, 1995 has been disclaimed.

[21] Appl. No.: 818,711

[22] Filed: Jul. 25, 1977

Related U.S. Application Data

[63] Continuation-in-part of Ser. No. 735,958, Oct. 27, 1976, abandoned, which is a continuation of Ser. No. 601,549, Aug. 4, 1975, abandoned.

[30] Foreign Application Priority Data

Aug. 3, 1976 [GB] United Kingdom ............... 32378/76

[51] Int. Cl.³ .................... H05B 3/12; B29C 27/00; H05B 3/38
[52] U.S. Cl. .................................... 156/86; 138/123; 138/124; 138/125; 138/126; 174/DIG. 8; 156/85; 156/273.9; 219/505; 219/548; 219/553; 338/212; 428/36; 428/212; 428/222; 428/225; 428/256; 428/913; 428/136; 53/442; 264/27; 264/230; 264/320
[58] Field of Search ........... 174/68 R, 117 F, DIG. 8; 338/212, 214; 156/84, 85, 86, 275; 264/27, 46.9; 138/123, 124, 125, 126, 127; 428/36, 212, 222, 225, 256, 315, 913; 219/505, 553, 548

[56] References Cited

U.S. PATENT DOCUMENTS

| 3,253,618 | 5/1966 | Cook .............................. 174/DIG. 8 |
| 3,253,619 | 5/1966 | Cook et al. .................... 174/DIG. 8 |
| 3,412,358 | 11/1968 | Hummel et al. .............. 174/DIG. 8 |
| 3,535,494 | 10/1970 | Armbruster ......................... 338/214 |
| 3,861,029 | 1/1975 | Smith-Johannsen et al. ...... 338/214 |
| 4,017,715 | 4/1977 | Whitney et al. .............. 174/DIG. 8 |
| 4,055,526 | 10/1977 | Kiyokawa et al. ................. 219/548 |
| 4,085,286 | 4/1978 | Horsma et al. ..................... 219/548 |
| 4,177,376 | 12/1979 | Horsma et al. .............. 174/DIG. 8 |
| 4,177,446 | 12/1979 | Diaz ................................... 338/212 |
| 4,223,209 | 9/1980 | Diaz ................................... 338/212 |
| 4,314,145 | 2/1982 | Horsma ............................... 219/505 |
| 4,330,703 | 5/1982 | Horsma et al. .............. 174/DIG. 8 |

FOREIGN PATENT DOCUMENTS 1050386 12/1966 United Kingdom .
1167551 10/1969 United Kingdom .
1269194 3/1972 United Kingdom ......... 174/DIG. 8
1516874 7/1978 United Kingdom .

Primary Examiner—William R. Dixon, Jr.
Attorney, Agent, or Firm—Lyon & Lyon

[57] ABSTRACT

Articles which are heat-recoverable, or which can be rendered heat-recoverable or which have been heat-recovered, comprise a member composed of a conductive polymer and, attached to said member, at least two electrodes, at least one of which is an electrode comprising a plurality of pliable conductive elements, e.g., a braided tube. By connecting the electrodes to a source of electrical power, current is caused to pass through and heat the conductive polymer member. The heat generated can be used to provide all or part of the heat necessary to cause recovery of the heat-recoverable article. The conductive polymer preferably exhibits PTC behavior, thereby regulating the maximum temperature to which the article can be heated.

46 Claims, 7 Drawing Figures

SELF-HEATING ARTICLE WITH DEFORMABLE ELECTRODES

CROSS-REFERENCE TO RELATED APPLICATIONS

This application is a continuation-in-part of our Ser. No. 735,958, filed Oct. 27, 1976, now abandoned, which is itself a continuation of our Ser. No. 601,549, filed Aug. 4, 1975, now abandoned.

BACKGROUND OF THE INVENTION

FIELD OF THE INVENTION

This invention relates to heat-recoverable articles which comprise one or more members of a conductive polymer (i.e., an organic polymer having sufficient finely divided electrically conductive material dispersed therein to render it electrically conductive).

SUMMARY OF THE PRIOR ART

Heat-recoverable polymeric articles are well known. Typically, they are made from crystalline polymeric materials which have been cross-linked chemically or by ionizing radiation. They may be used to provide sealing, insulating or protective coatings on substrates, for example electrical joints and terminations. Reference may be made, for example, to U.S. Pat. Nos. 2,027,962, 3,086,242, 3,379,218, 3,455,336 and 3,770,556, the disclosures of which are hereby incorporated by reference. It has also been proposed (see Cook U.S. Pat. No. 3,253,618) to provide a heat-recoverable article with a knitted reinforcement of any suitable fiber material, including conductive fibres. It has further been proposed (see Cook et al U.S. Pat. No. 3,253,619) to provide a heat-recoverable article with a braided reinforcement of any suitable fibre, including conductive fibres, the braid angle of the fibres to the axis of the tube being not more than 45°.

Heat-recoverable articles are typically recovered by means of a torch or hot air gun, but this has serious disadvantages in many situations. It has, therefore, been proposed (see British Pat. No. 1,265,194) to make heat-recoverable articles out of conductive polymers and to cause recovery of the article by passing an electric current through the conductive polymer, thus raising the temperature of the article to the recovery temperature, the current being supplied to the ends or intermediate points of the article by any suitable method, using for example alligator clips or other conventional clamps or electrodes; if desired, the heat-recoverable conductive polymer article can be laminated to another heat-recoverable article which is simultaneously recovered. Unfortunately, however, it has been found that such articles do not give consistently satisfactory recovered products because heat is not generated sufficiently uniformly and/or because the means for supplying the current to the conductive polymer interferes with recovery or limits the way in which the article can be deformed in order to render it heat-recoverable.

Conductive polymer compositions are well known and have been used in heating devices of various kinds. Reference may be made, for example, to U.S. Pat. No. 3,535,494 (Armbruster), which describes flexible heating mats which comprise a thin layer of a conductive polymer sandwiched between metal foil electrodes and to U.S. Pat. No. 3,359,524 (Gallacher et al), which describes flexible heating elements which comprises a ribbon of a conductive polymer having attached to the edges thereof electrodes which are composed of strands of conductive material wound about a core of textile fibers.

It is also known that a small proportion of conductive polymer compositions exhibit PTC (positive temperature coefficient) behavior, i.e., they undergo a sharp increase in resistivity over a particular temperature range. Examples of such compositions are shown in U.S. Pat. No. 3,412,358 (Hummel et al). For a full discussion of PTC compositions and their switching temperatures ($T_s$) reference may be made to U.S. Ser. No. 601,638, filed Aug. 4, 1975 by David A. Horsma et al, and having the same assignee as this application, the disclosure of which is hereby incorporated by reference. Heating elements of PTC materials are self-limiting, i.e., can be operated so that they do not exceed a particular temperature, because of the increase in resistivity which takes place on increasing temperature.

SUMMARY OF THE INVENTION

We have now discovered that by using electrodes of a particular type in conjunction with conductive polymer members, it is possible to prepare heat-recoverable articles which can be self-heated by connection to a source of electrical power to give easy and efficient recovery from a wide variety of deformed configurations. The recovered articles can if desired be used as electrical heaters.

The heat-recoverable articles comprise:

(a) a member which comprises an organic polymer having sufficient finely divided electrically conductive particles dispersed therein to render the member conductive; and (b) at least two electrodes which are in contact with said member and which when connected to a source of electrical power cause current to flow through said member, and at least one of which electrodes is a deformable electrode which comprises a plurality of pliable electrically conductive elements and which, when said article is heat-recovered, undergoes a dimensional change in the direction of heat-recovery of said article without substantially impeding recovery of said article.

DETAILED DESCRIPTION OF THE INVENTION

Figure 1:
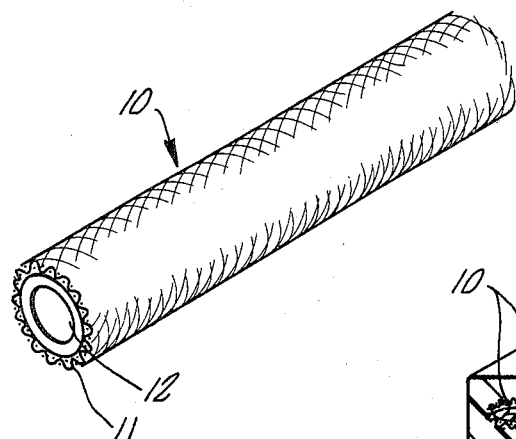
FIG. 1 is a view of a braided electrode according to the invention.

The conductive polymer member (a) is preferably heat-recoverable, but the invention also includes articles wherein the conductive polymer member (a) is not itself heat-recoverable but is secured to a non-conductive heat-recoverable member, as well as, of course, articles wherein the member (a) is heat-recoverable and is secured to a non-conductive heat-recoverable member. The member (a) comprises an organic polymeric composition having sufficient conductive filler, for example, particulate carbon black or metals, so that it is capable of conducting an electrical current at a given voltage, such as 12 to 36 volts from a battery or 115 volt A.C. The composition should also exhibit sufficient ohmic resistance so that its $I^2R$ heat output is capable of effecting recovery of the heat-recoverable article, which may be several hundred mils thick. Suitable polymers for use in these compositions can be selected from a wide vaiety of candidates. Particularly useful are crosslinked crystalline polymers as described in Cook, U.S. Pat. No. 3,086,242. Such polymers can be deformed above their crystalline melting point or range (hereinafter crystalline m.p.) and held there until cool to be rendered heat-recoverable.

As will become clearer hereinafter, in many applications it will be desirable that the heat-recoverable member comprise one or more layers of the conductive polymers described above. In these applications, the layers may be either constant wattage or PTC layers. PTC compositions have been described in the Background of the Invention. Preferably, the PTC materials useful in the present invention will exhibit at least a six fold increase in resistance in a 30° C. segment beginning at $T_s$. A constant wattage layer can be defined as being other than a PTC layer which is to say that though its resistance may increase with temperature it does not exhibit a $T_s$ at which its resistance increases so rapidly that for most purposes it becomes an insulator. Within the context of this specification, a constant wattage material may be regarded as one whose resistance does not increase by a factor of more than about six (6) in any 30° segment between 25° C. and the melting point of the polymer or higher temperatures if the polymer has been crosslinked to give it structural integrity above the melting point. Preferably it has a resistivity of at least about 1 ohm/square at 25° C.

Constant wattage materials suitable for use in the present invention are known of the prior art. In many instances the same polymers useful for PTC compositions can be used for constant wattage layers by incorporating in the polymer a higher loading of conductive filler that can be used for PTC compositions. In many instances even compositions exhibiting PTC character can be employed where their $T_s$ temperature is high enough. The details that characterize PTC materials and constant wattage materials useful in the present invention are described at length in concurrently filed application, Horsma et al, "Layered Self-Regulating Heating Articles", Ser. No. 601,638, having the same assignee as the present invention, the disclosure of which is incorporated by reference.

The deformable electrodes as defined above, are preferably fabricated from materials that have low resistivity and that are moderate in cost. A presently preferred material is copper wire strand, and particularly 28–40 gauge wire strand. Strands of other metals, including alloys and bicomponent metal strand, metal and polymer fiber composites, metal plated polymer fibers or conductive carbon fibers and the like can also be used.

The electrodes will normally be secured to, preferably embedded in, the conductive polymer member before the article is deformed to render it heat-recoverable, and should therefore be so formed, and placed in such a configuration, that they can be dimensionally deformed into the heat-recoverable configuration.

In one embodiment, the electrodes comprise fibres or other elongate elements which have been united together by any suitable method, preferably by knitting, weaving or braiding into a pliable structure which is deformable in at least one dimension, preferably the axial direction, preferably by at least 50%, particularly at least 70%, especially at least 100%; in some cases yet higher extensibility is desirable, for example at least 200% or 300%, all based on the initial dimension. Particularly preferred electrodes are made by braiding, especially into a tubular braid having a high braid angle, for example, greater than about 50° and preferably about 75° relative to the axis of the tube. In some applications, for example, where it is desired that the tube be radially expansible rather than longitudinally extensible, lower braid angles can be employed. The braiding character of radially expansible tube is described in Cook, U.S. Pat. No. 3,253,619.

One suitable braid is obtained by using 16 carriers each of four strands of 38 AWG tinned copper wire at a 75° braid angle. Preferably the fibres are braided about a cylindrical core, which may be tubular, e.g., of outside diameter about 0.25 inch, composed of a conductive or non-conductive thermoplastic material (preferably conductive), which is preferably compatible with the polymer of the heat-recoverable member. In most applications, before such an electrode is secured to the conductive polymer member, it is heated to above the softening point of the thermoplastic core and flattened, care being taken to avoid stretching the braid in the course of this deformation.

In another embodiment, the deformable electrode is a metal sheet which has a plurality of apertures therein, the apertures being of closed cross-section and overlapping one another to permit at least one of the dimensions of the sheet to be changed by a change in the shape of the apertures, e.g., slits or diamond shaped holes. Preferably, the sheet is of aluminum, which can readily be pierced by known methods to provide the desired apertures. A similar electrode can be made by welding or otherwise securing together a plurality of metal wires in the form of a net.

In most cases the articles of the invention will comprise at least two deformable electrodes which when connected to a source of electrical power will cause current to flow through the conductive polymer member, and often each of the electrodes in the article will be deformable electrodes. However, it is also possible to employ one or more deformable electrodes of one polarity and one or more other electrodes, e.g., of metal foil, which are not dimensionally deformable, thus inducing differential shrinkage of the article. When the electrodes are knitted, woven or braided, the articles will often comprise a heat-recoverable member, e.g., in the form of a heat-shrinkable sheet or heat-shrinkable tube having at least one open end, and a plurality of elongate deformable electrodes embedded in said member in parallel and spaced apart configuration such that on heat-shrinkage of said article the electrodes contract axially. When the electrodes are apertured metal sheets as described above, the articles will often comprise a conductive polymer member and electrodes having substantially the same planar dimensions.

Figure 2:
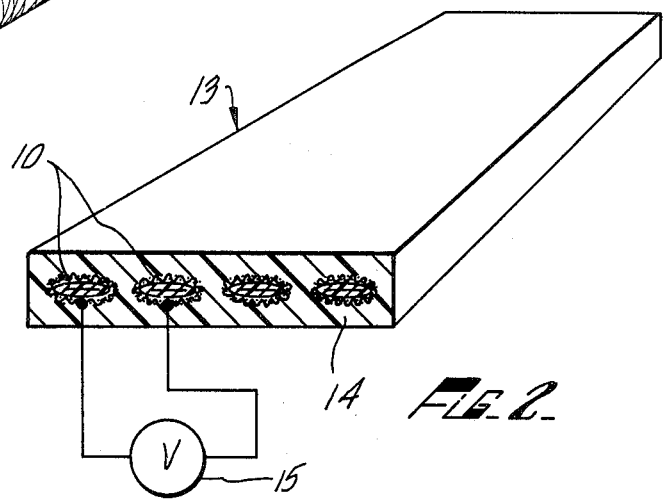
FIGS. 2, 3 and 5–7 are views of self-heating articles according to the invention.

With reference now to the drawings, the many applications to which the present invention can be put will be further elucidated. In FIG. 1, there is shown a braided electrode 10 before flattening comprising tubular braid 11 over hollow core member 12. A plurality of such electrodes after flattening is shown in FIG. 2 as components of a heat-recoverable article 13 in which layer 14 is a conductive polymer composition, for example, either a PTC layer or constant wattage layer as hereinbefore described. In a typical application, the electrodes will be coterminous with the polymer layer. When pairs of these electrodes are connected in series to a current source such as 15, current is conducted between the electrodes through the conductive polymer composition. If sufficient power is used, enough heat can be generated to provide at least part and preferably all of the heat needed to effect recovery of the article. From a consideration of the article of FIG. 2, it can be seen that the polymer composition could have been deformed in either or both of two directions, i.e., either by separating the electrodes and/or by elongating the article along the long axis of the electrodes to impart heat-recoverability. A conventional rigid electrode would allow deformation only by separating the electrodes. Therein lies a particular advantage of the present invention over conventional techniques. Since the separation of electrodes increase the path length and therefore the resistance of the heater, then this approach will limit the power output of the heater in the expanded state.

Should the polymer of the article of FIG. 2 be a PTC composition, it will be appreciated that the heating will be limited to the $T_s$ temperature. Furthermore, it will also be appreciated that the article of FIG. 2 will be self-heating and capable of functioning advantageously as a heater after recovery whether or not the self-heating capability is employed to occasion recovery of the article.

Figure 3:
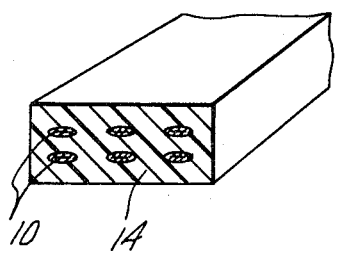
Figure 4:
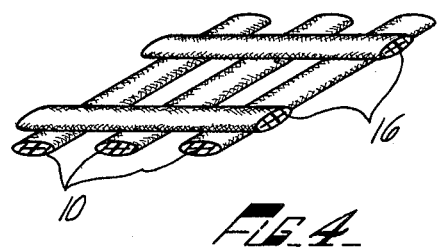
FIG. 4 depicts an electrode assembly useful in the present invention.

Another, and preferred, arrangement of electrodes is shown in FIG. 3 in which the electrodes are arranged in layers. In the article of FIG. 3, the electrodes 10 of one layer for example, the upper layer, are connected in parallel with one another and in series with those of the lower layer through the polymer layer. Bussing electrodes, which might themselves be fabric electrodes, can be employed to distribute power to the electrodes of one layer as is shown in FIG. 4. In FIG. 4, one of the layers of electrodes is shown as it might appear before incorporation into the heat-recoverable article having at either end one of a pair of bussing electrodes 16. If the bussing electrodes are fabric electrodes like electrodes 10, the electrodes 10 and bussing electrodes 16 can be caused to adhere to each other by heating their thermoplastic core above the softening point and pressing them together, or by conventional spot welding or soldering techniques. The resulting electrode structure can be defomed along and/or perpendicular to the long axis of electrodes 10.

Figure 5:
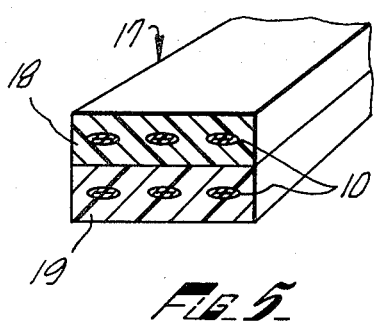
Figure 6:
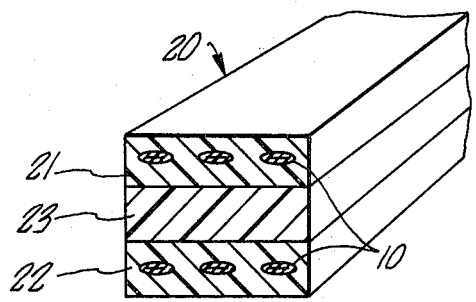

As indicated for FIG. 2, the polymeric composition of FIG. 3 may either be a constant wattage layer or a PTC layer. When using thin films of PTC compositions, in which current flow is in the plane of the film, it has been found that even at moderate power outputs, the phenomenom of "hotlining" occurs in which only a narrow band of the PTC layer functions as a heater. This problem is addressed in the aforementioned application Ser. No. 601,638. Hotlining can be avoided by employing two layers of conductive polymer in which one is a constant wattage layer and the other a PTC layer. A structure 17 employing this discovery using the electrodes of the present invention is shown in FIG. 5 in which layer 18 is a constant wattage layer in which is incorporated one set of electrodes 11. Another set of electrodes 11 is incorporated into the layer 19 which is a PTC layer. Optionally, a third layer of a constant wattage composition can be employed to sandwich the PTC layer. Such a structure 20 is shown in FIG. 6 in which layers 21 and 22 are constant wattage layers and layer 23 a PTC layer.

The temperature $T_s$ at which the resistance of a PTC layer increases sharply is at or below the crystalline m.p. for crystalline polymers. Such polymers if in a heat-recoverable form, undergo recovery above their crystalline m.p. and sufficient mobility for efficient recovery requires temperatures at least about 10° C. above the crystalline m.p. Using a layered system such as those shown in FIGS. 5 or 6 and providing relative resistance between the constant wattage layer or layers and the PTC layer such that the constant wattage layer heats first, i.e., its resistance is higher than the PTC layer, the article can be heated above $T_s$ by rapidly heating the constant wattage layer before thermal conduction raises the temperature of the PTC layer to $T_s$ thereby shutting down the current.

Figure 7:
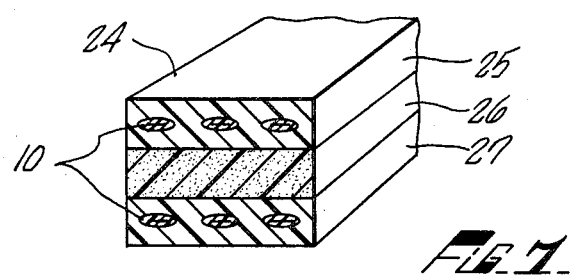

A more efficient method for accomplishing this end is described in commonly assigned application Ser. No. 601,427, Horsma and Whitney, "Temperature Overshoot Heaters", now U.S. Pat. No. 4,017,175 the disclosure of which is incorporated by reference. That method disposes a relatively low resistance, thermally insulating, constant wattage layer between the constant wattage heating layer and the PTC layer. Such a configuration is shown in FIG. 7 in which heat-recoverable article 24 comprises constant wattage layer 25 of relatively high resistance, a thermally insulating layer 26 of relatively low resistance and PTC layer 27 of intermediate initial resistance. As shown, layer 26 is a foamed polymeric material giving it good thermal insulating properties. Preferably, it is highly conductive, i.e., has low resistance. When current is applied, layer 25 heats up but the PTC layer 27 is thermally shielded by the layer 26 and its temperature increase will lag behind that of layer 25. Thus the layer 25 can be caused to heat well above the crystalline melting point of the heat-recoverable member before the power is shut down by the temperature of the PTC layer heating to $T_s$. Thermal conductivity effects will allow the entire article to eventually be heated above the recovery temperature, i.e., the crystalline melting point, an adequate amount to insure efficient recovery. It will be appreciated that layer 25 may also be a PTC layer so long as its $T_s$ is higher than that of layer 27.

In the foregoing discussion it has been suggested that all the layers of a multi-layer article are heat-recoverable. This need not be the case. So long as at least one layer is heat-recoverable with sufficient hold out strength to retain the other layers in a deformed condition, or sufficient recovery force to urge the other layers towards the heat stable configuration, the latter need not be heat-recoverable.

In the foregoing figures, the electrodes are shown embedded in a layer comprising a polymeric composition. This is most conveniently achieved by disposing the electrodes between two polymer sublayers that are subsequently laminated together, for example, sublayers that have been heated above their softening points and bonded together using laminating rollers.

The foregoing discussion has stressed relatively planar articles. This has been done for illustrative purposes only. Other articles of regular or irregular configurations can advantageously be fabricated according to the present invention. For example, tubular articles having plural deformable electrodes disposed in one or more layers either parallel to the long axis of the tube or perpendicular to that axis can be employed. A particularly preferred application, "Heat-Recoverable Self-Heating Article and Method of Sealing A Splice There-from", by Horsma and Diaz, Ser. No. 601,344, filed Aug. 4, 1975, now U.S. Pat. No. 4,085,286, the disclosure of which is incorporated by reference. Other applications are easily envisioned by those skilled in the art. For example, a tubular structure such as described above could be disposed about a cylindrical conduit and used after installation to heat the contents of the conduit to prevent freezing or salting out of solids.

We claim:
1. A heat-recoverable article which comprises:
 (a) a heat-recoverable, continuous member which comprises an organic polymer having sufficient finely divided electrically conductive particles dispersed therein to render the member conductive; and
 (b) at least two electrodes which are in contact with said member and spaced from each other and which when connected to a source of electrical power cause current to flow through said member, and at least one of which electrodes is a deformable electrode which comprises a plurality of pliable electrically conductive elements and which, when said article is heat-recovered, undergoes a dimensional change in the direction of heat-recovery of said article without substantially impeding recovery of said article.
2. An article according to claim 1 wherein said deformable electrode comprises a plurality of electrically conductive fibres which have been united to each other into a pliable, elongate structure which is deformable in the axial direction.
3. An article according to claim 2 wherein said deformable electrode comprises a plurality of electrically conductive fibres which have been united to each other by braiding.
4. An article according to claim 3 wherein the fibres have been united to each other by braiding them into a tube at a braid angle relative to the axis of the tube which is greater than 50°.
5. An article according to claim 4 wherein said braid angle is about 75°.
6. An article according to claim 4 wherein the braided tube is present in the article in a flattened configuration.
7. An article according to claim 3 wherein the fibres have been braided into a tube around a core of a thermoplastic polymer.
8. An article according to claim 2 which on complete recovery changes at least one of its dimensions by at least 100%, based on the fully recovered dimension.
9. An article according to claim 2 wherein said member is heat-recoverable and which comprises at least two of said deformable electrodes which when connected to a source of electrical power cause current to flow through said member.
10. An article according to claim 9 wherein at least part of said member exhibits a positive temperature coefficient of resistance so that current is substantially prevented from flowing through said member at a predetermined temperature which is sufficiently high to cause recovery of the member.
11. An article according to claim 10 wherein part of said member exhibits constant wattage behavior at temperatures below the switching temperature of the part exhibiting a positive temperature coefficient of resistance.
12. An article according to claim 10 wherein said member comprises a layer exhibiting a positive temperature coefficient of resistance which is sandwiched between two layers, each exhibiting constant wattage behavior at temperatures below the switching temperature of the layer exhibiting a positive temperature coefficient of resistance and each of said constant wattage layers having at least one said deformable electrode embedded therein.
13. An article according to claim 2 wherein the fibers have been united to each other by weaving.
14. An article according to claim 2 wherein the fibers have been united to each other by knitting.
15. An article according to claim 1 wherein each of said electrodes is such a deformable electrode.
16. An article according to claim 15 wherein said member is selected from heat-shrinkable sheets and heat-shrinkable tubes having at least one open end and which comprises a plurality of elongate deformable electrodes embedded in said member in parallel and spaced-apart configuration such that on heat-shrinkage of said article the electrodes contract axially.
17. An article according to claim 16 wherein each of said electrodes comprises a plurality of electrically conducting fibres which have been braided together as a tube.
18. An article according to claim 16 wherein each of said electrodes comprises a plurality of electrically conducting fibres which have been braided into a tube around a core of a thermoplastic polymer at a braid angle relative to the axis of the tube of greater than 50°.
19. An article according to claim 1 which on complete recovery changes at least one of its dimensions by at least 50%, based on the fully recovered dimension.
20. A heat-recoverable article which comprises:
 (a) a heat-recoverable continuous member which comprises an organic polymer having sufficient finely divided electrically conductive particles dispersed therein to render the member conductive; and
 (b) at least two electrodes which are in contact with said member and spaced from each other and which when connected to a source of electrical power cause current to flow through said member, and at least one of which electrodes is a deformable electrode which comprises a metallic sheet which has a plurality of apertures therein, the apertures being of elongated cross-section and overlapping one another to permit at least one of the dimensions of the sheet to be changed by a change in the shape of the apertures, wherein when said article is heat-recovered, the deformable electrode undergoes a dimensional change in the direction of heat-recovery of said article without substantially impeding recovery of said article.
21. An article according to claim 20 which comprises at least two said deformable electrodes and a said member in the form of a heat-recoverable sheet between said electrodes.
22. An article according to claim 21 wherein said deformable electrodes have substantially the same planar dimensions as the heat-recoverable member.
23. An article according to claim 21 which is in the form of a heat-shrinkable tube.
24. An article according to claim 21 which is in the form of a heat-shrinkable flat sheet.
25. An article according to claim 24 which is in the form of a tape.
26. An article according to claim 21 wherein at least part of said heat-recoverable member exhibits a positive temperature coefficient of resistance so that current is substantially prevented from flowing through said member at a predetermined temperature which is sufficiently high to cause recovery of the member.

27. An article according to claim 26 which comprises at least two of said deformable electrodes, one on each side of said heat-recoverable member.

28. An article according to claim 27 which comprises a heat-recoverable layer exhibiting a positive temperature coefficient of resistance which is sandwiched between two layers, each exhibiting constant wattage behavior at temperatures below the switching temperature of the layer exhibiting a positive temperature coefficient of resistance and each of said constant wattage layers having at least one said deformable electrode embedded therein.

29. A heat-shrinkable article which comprises:
(a) a heat-shrinkable continuous member which comprises an organic polymer having finely divided, electrically conductive carbon black dispersed therein to render the member electrically conductive; and
(b) at least two deformable electrodes which are embedded in said member and spaced from each other, which when connected to a source of electrical power cause current to flow through said member, and each of which comprises a plurality of metal fibres which have been united to each other, into a pliable elongate structure having a long axis which, when said member is heat-shrunk, contracts axially in the direction of heat-shrinkage without substantially impeding recovery of said member.

30. An article according to claim 29 wherein at least part of said member exhibits a positive temperature coefficient of resistance so that current is substantially prevented from flowing through said member at a predetermined temperature which is sufficiently high to cause shrinkage of said member.

31. An article according to claim 30 in the form of a sheet.

32. An article according to claim 29 which is in the form of a tube having at least one open end.

33. An article according to claim 29 wherein the metal fibers have been united to each other by knitting.

34. An article according to claim 29 wherein the metal fibers have been united to each other by braiding.

35. An article which is capable of being rendered heat-recoverable and which comprises:
(a) a continuous member which comprises an organic polymer having sufficient finely divided electrically conductive particles dispersed therein to render the member electrically conductive and which is capable of being rendered heat-recoverable; and
(b) at least two electrodes which are in contact with said member and spaced from each other, which when connected to a source of electrical power cause current to flow through said member, and each of which comprises a plurality of electrically conductive fibres which have been united to each other, into a pliable elongate structure having a long axis which is deformable in the axial direction.

36. An article according to claim 35 wherein said deformable electrodes can be deformed in the axial direction by at least 50%.

37. An article according to claim 35 wherein said deformable electrodes can be deformed in the axial direction by at least 100%.

38. An article according to claim 31 wherein the fibres have been braided into a tube around a core of a thermoplastic polymer.

39. An article according to claim 35 wherein said deformable electrodes can be deformed in the axial direction by at least 300%.

40. An article according to claim 35 wherein the electrically conductive fibres have been united to each other by braiding.

41. An article according to claim 35 wherein the fibres have been united to each other by braiding them into a tube at a braid angle relative to the axis of the tube which is greater than 50°.

42. An article according to claim 35 wherein the fibers have been united to each other by weaving.

43. An article according to claim 35 wherein the fibers have been united to each other by knitting.

44. A heat-recoverable article which comprises:
(a) a heat-recoverable, continuous member which comprises an organic polymer having sufficient finely divided electrically conductive particles dispersed therein to render the member conductive; and
(b) at least two electrodes which are in contact with said member and spaced apart from each other and which when connected to a source of electrical power cause current to flow through said member, and at least one of which electrodes is a deformable electrode which, when said article is heat-recovered, undergoes a dimensional change in the direction of heat-recovery of said article without substantially impeding recovery of said article,
wherein said article on complete recovery changes at least one of its dimensions by at least 50%, based on the fully-recovered dimension.

45. A heat-recoverable article which comprises:
(a) a continuous, heat-shrinkable member which comprises an organic polymer having sufficient finely divided electrically conductive particles dispersed therein to render the member conductive, wherein at least part of said member exhibits a positive temperature coefficient of resistance so that current is substantially prevented from flowing through said member at a predetermined temperature which is sufficiently high to cause recovery of the member; and
(b) at least two electrodes which are in contact with said member and spaced apart from each other and which when connected to a source of electrical power cause current to flow through said member, and at least one of which electrodes is a deformable electrode which comprises a plurality of pliable electrically conductive elements and which, when said article is heat recovered, undergoes a dimensional change in the direction of heat-recovery of said article without substantially impeding recovery of said article,
wherein on complete recovery the article changes at least one of its dimensions by at least 50%, based on the fully-recovered dimension.

46. A process for providing a substrate with a covering which comprises:
(1) placing adjacent to the substrate a heat-recoverable article which on recovery will cover said substrate and which comprises:
(a) a heat-recoverable, continuous member which comprises an organic polymer having sufficient finely divided electrically conductive particles dispersed therein to render the member conductive; and (b) at least two electrodes which are in contact with said member and spaced from each other and which when connected to a source of electrical power cause current to flow through said member, and at least one of which electrodes is a deformable electrode which comprises a plurality of pliable electrically conductive elements and which, when said article is heat-recovered, undergoes a dimensional change in the direction of heat-recovery of said article without substantially impeding recovery of said article; and (2) connecting said electrodes to a source of electrical power, thereby causing said article to recover.

* * * * *